(12) United States Patent
Li et al.

(10) Patent No.: US 7,991,615 B2
(45) Date of Patent: Aug. 2, 2011

(54) GRAPHEME-TO-PHONEME CONVERSION USING ACOUSTIC DATA

(75) Inventors: Xiao Li, Bellevue, WA (US); Asela J. R. Gunawardana, Seattle, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 786 days.

(21) Appl. No.: 11/952,267

(22) Filed: Dec. 7, 2007

(65) Prior Publication Data

US 2009/0150153 A1    Jun. 11, 2009

(51) Int. Cl.
*G10L 15/04* (2006.01)
(52) U.S. Cl. .......... 704/254; 704/244; 704/255
(58) Field of Classification Search .......... 704/251, 704/260, 9, 10, 231, 235, 244, 254, 255
See application file for complete search history.

(56) References Cited

U.S. PATENT DOCUMENTS

| | | | |
|---|---|---|---|
| 6,078,885 | A | 6/2000 | Beutnagel |
| 6,094,633 | A | 7/2000 | Gaved et al. |
| 6,230,131 | B1 | 5/2001 | Kuhn et al. |
| 7,107,216 | B2 | 9/2006 | Hain |
| 7,216,079 | B1 | 5/2007 | Barnard et al. |
| 7,266,495 | B1 | 9/2007 | Beaufays et al. |
| 7,280,964 | B2 * | 10/2007 | Wilson et al. ............ 704/251 |
| 7,406,417 | B1 * | 7/2008 | Hain ....................... 704/260 |
| 2005/0203739 | A1 | 9/2005 | Hwang et al. |
| 2006/0031069 | A1 | 2/2006 | Huang et al. |
| 2006/0064177 | A1 | 3/2006 | Tian et al. |
| 2006/0215821 | A1 | 9/2006 | Rokusek et al. |
| 2006/0265220 | A1 | 11/2006 | Massimino |

OTHER PUBLICATIONS

International Search Report and Written Opinion for PCT Application No. PCT/US2008/083249, mailed on Apr. 28, 2009, 10 pages.
Bisani et al., "Investigations on Joint-Multigram Models for Grapheme-to-Phoneme Conversion", In: 7th International Conference on Spoken Language Processing, Sep. 2002, pp. 105-108.
Chen, Stanley F., "Conditional and Joint Models for Grapheme-to-Phoneme Conversion", In: Proceedings of Eurospeech 2003, Sep. 2003, pp. 2033-2036.
Bisani, "Multigram-based Grapheme-to-Phoneme Conversion for LVCSR", pp. 1-4.
Bellegarda Jerome R., "A Novel Approach to Unsupervised Grapheme- to-Phoneme Conversion", pp. 1-4.
Decadt, et al., "Optimizing Phoneme-to-Grapheme Conversion for Out-of-Vocabulary Words in Speech recognition", Date: 2001, pp. 1-9.

* cited by examiner

*Primary Examiner* — Huyen X. Vo

(57) ABSTRACT

Described is the use of acoustic data to improve grapheme-to-phoneme conversion for speech recognition, such as to more accurately recognize spoken names in a voice-dialing system. A joint model of acoustics and graphemes (acoustic data, phonemes sequences, grapheme sequences and an alignment between phoneme sequences and grapheme sequences) is described, as is retraining by maximum likelihood training and discriminative training in adapting graphoneme model parameters using acoustic data. Also described is the unsupervised collection of grapheme labels for received acoustic data, thereby automatically obtaining a substantial number of actual samples that may be used in retraining. Speech input that does not meet a confidence threshold may be filtered out so as to not be used by the retrained model.

17 Claims, 5 Drawing Sheets

GRAPHEME-TO-PHONEME CONVERSION USING ACOUSTIC DATA

BACKGROUND

Grapheme-to-phoneme (G2P) conversion is directed towards automatically generating pronunciations (or phoneme sequences) from word spellings (or grapheme sequences). Grapheme-to-phoneme is a widely used component in large-scale voice-dialing systems.

Many grapheme-to-phoneme systems are based on statistical models, which are trained using hand-authored pronunciation lexicons. However, the grapheme-phoneme relationships that occur in pronunciation lexicons, which are usually authored by linguists, often do not reflect how people pronounce words in practice, or may not cover enough variations. This makes such a grapheme-to-phoneme model less than ideal for speech-related tasks.

By way of example, consider recognizing names. One challenge is referred to as domain mismatch; some grapheme-phoneme relationships that occur in names may be lacking from a pronunciation lexicon. Although some names and their pronunciations may be added into the lexicon, it is unrealistic to do so at a large scale, as there may be an enormous number of unique names, and it is often the rare names that have irregular pronunciations.

Another challenge is speaker variability. People from different geographic regions and ethnic groups may pronounce the same name in different ways. A hand-authored pronunciation lexicon cannot reasonably capture such variations.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which acoustic data, phonemes sequences, grapheme sequences and an alignment between phoneme sequences and grapheme sequences provide a graphoneme model that is used to retrain a grapheme to phoneme model usable in speech recognition. In general, the retraining includes optimizing the graphoneme model using acoustic data. In aspect, optimizing the graphoneme model comprises performing maximum likelihood training or discriminative training of the graphoneme model's parameters using the acoustic data. In one aspect, retraining includes combining a pronunciation lexicon and acoustic information, such as by interpolating graphoneme model parameters or obtaining grapheme-phoneme pairs that are combined with data in the pronunciation lexicon.

In one example implementation, grapheme labels are automatically (e.g., without supervision) collected for acoustic data used in retraining. The acoustic data is received as speech input, such as in a voice-dialing system. The acoustic data is recorded and recognized as a potential grapheme label. If the speaker confirms the potential grapheme label is correct, the acoustic data is persisted in association with that grapheme label. Multiple interactions with the speaker may take place to receive additional acoustic data and obtain the confirmation. Speech input that does not meet a confidence threshold may be filtered out so as to not be used in the retrained model.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
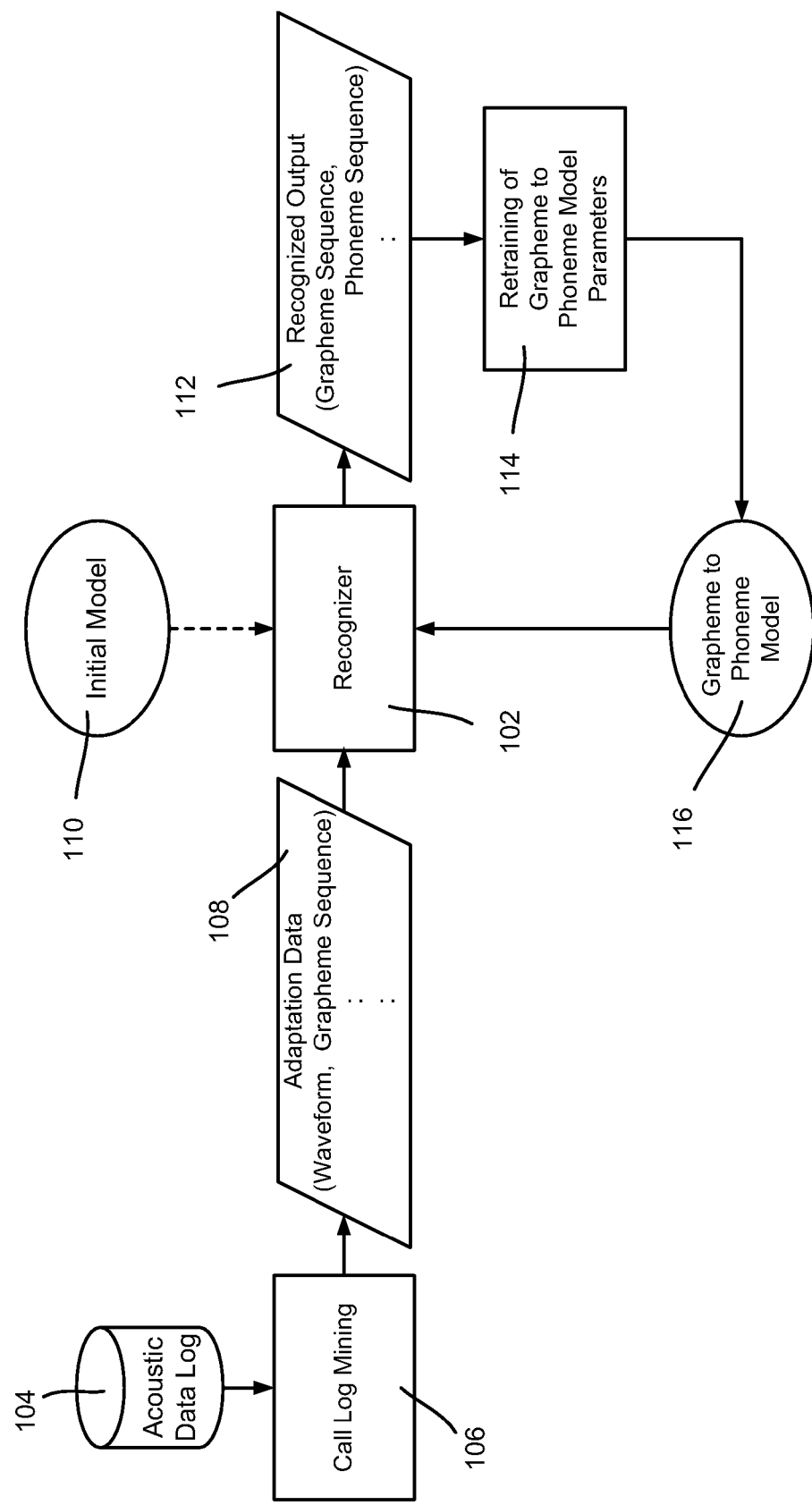
FIG. 1 is a block diagram representing example components of used in training and adapting a speech recognition model.

Various aspects of the technology described herein are generally directed towards leveraging acoustic data, to adapt a grapheme-to-phoneme model for speech recognition. In one aspect, this may be used to directly augment or modify an existing pronunciation lexicon with pronunciations generated from acoustic data. By way of example, spoken name recognition may use acoustic data obtained from a large-scale voice-dialing system.

As described below, adaptation via adaptation data is performed at a graphoneme level, which considers a grapheme sequence, a phoneme sequence and an alignment and grouping between the grapheme sequence and phoneme sequence. As will be understood, a resulting grapheme-to-phoneme conversion not only improves pronunciation for words (including names) that occur in the adaptation data, but also generalizes to unseen words. There is thus provided a joint model of acoustics and graphonemes in adapting graphoneme model parameters, with two example training approaches described, namely maximum likelihood training and discriminative training.

As will be understood, various examples set forth herein are primarily described with respect to recognizing spoken names and/or English language words and names. However, as can be readily appreciated, the technology is applicable to any types of speech recognition and/or other languages. Further, while it can be readily appreciated that improving grapheme-to-phoneme conversion using acoustic information can significantly improve speech recognition, the same techniques can be applied to improve the quality of speech synthesis.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in speech recognition and/or speech synthesis in general.

With respect to training, probabilistic relationships between graphemes and phonemes are constructed using a graphoneme n-gram model (also referred to as a joint multi-gram model). More particularly, to create graphoneme sequences from a pronunciation lexicon, based on which a graphoneme n-gram model can be trained, the following table may be used as an example (of the word "letter") setting forth the concept of a graphoneme sequence:

| grapheme sequence  | l   | e    | t   | t   | e    | r   |
|--------------------|-----|------|-----|-----|------|-----|
| phoneme sequence   | l   | eh   | t   | ∈   | ax   | r   |
| graphoneme sequence| l:l | e:eh | t:t | t:∈ | e:ax | r:r |

As used herein, a random variable g denotes a grapheme sequence, and φ denotes a phoneme sequence. The variable s represents an alignment and a grouping of φ and g, as defined in this example.

Considering the English language word letter, g is equal to (l, e, t, t, e, r) and φ is equal to (l, eh, t, ax, r). One possible way of aligning g and φ is shown in the above, where ∈ denotes a null phoneme. Given such an alignment, primitive graphoneme units can be generated by associating graphemes with their phoneme counterparts, as shown in the last (graphoneme sequence) row.

Next, adjacent graphoneme units may be grouped together to form larger units. In the above example, merging l:l with e:eh, and e:ax with r:r, results in:

$$l\&e{:}l\&eh\ t\&t{:}t\&e\ e\&r{:}ax\&r \quad (1)$$

The form of (1) is defined as a graphoneme sequence, which is fully determined by (g,φ,s).

Such graphoneme sequences as in (1) may be created from a pronunciation lexicon of parallel grapheme and phoneme sequences, that is, s is inferred given a set of (g;φ) pairs. To this end, one step automatically aligns g and φ to form primitive graphonemes via an Expectation Maximization (EM) approach, where alignment is inferred using graphoneme unigram statistics. Another step merges graphemes into larger units, using an algorithm based on mutual information, and by allowing a graphoneme unit to have maximally k graphemes and l phonemes. The result is a corpus of graphoneme sequences.

Given the corpus of graphoneme sequences, a standard n-gram model with backoff may be trained. Note that depending on the amount of training data, a cutoff threshold may be used to adjust model complexity; e.g., an n-gram will be excluded from the model if it has a count no more than this threshold. Then, grapheme-to-phoneme conversion may be achieved by applying a best-first search algorithm (or another suitable search algorithm).

Turning to a consideration of the use of acoustics in adapting such a model, as described herein, optimizing grapheme-to-phoneme conversion improves speech (including name) recognition. With respect to such an optimization, acoustic data is very useful in learning grapheme-phoneme relationships that occur in real-world applications. Another random variable, x, is used to represent acoustics, which may be jointly modeled with the other variables (providing x,g,φ and s) as set forth below as Equation (2):

$$\log p_\theta(x,g,\phi,s) = \log p(x|\phi) + \log p_\theta(g,\phi,s) \quad (2)$$

The factorization follows the assumption that x is independent of g and s given φ. Therein, the joint likelihood is expressed by an acoustic model score p(x|φ) and a graphoneme model score $p_\theta(g,\phi,s)$, where θ represents n-gram model parameters to be adapted. Note that a fixed acoustic model is used in this example, and p(x|φ) is therefore not parameterized. Moreover, a scale factor a may be used, which serves similarly to a language model scale factor in speech recognition; Equation (2) becomes:

$$\approx \log p(x|\phi) + a \log p_\theta(g,\phi,s) \quad (3)$$

A reasonable value for the scale factor a of 0.25 has been used. Note that for simplicity, a is omitted in the following examples, however in practice such a factor a is applied to Equation (2).

As can be seen, equation (2) (and thus equation (3)) provides a mechanism for jointly modeling acoustics, a phoneme sequence, and a grapheme sequence, as well as the alignment between the phoneme sequence and grapheme sequence. The joint probability can factorize according to Equation (2). Note that the first term in Equation (2) can be any acoustic model, which is fixed. The second term is an n-gram based graphoneme model, which is to be optimized. Note that as described herein, the term "optimize" and its variants (e.g., optimizing) and the term maximize and its variants (e.g., maximizing) do not necessarily mean ideal or perfect, but instead may mean moving towards such states, (e.g., better than previous up to some convergence threshold, closer to a true maximum, and so forth).

In general, both x and g (the acoustic data and its grapheme label) are observable, whereas φ and s (the phoneme sequence and alignment) are hidden. There is also a set of adaptation data $(x_i, g_i)$ available. Note that as described herein, (such as with reference to the example flow diagram of FIG. 4), grapheme labels g for acoustic data x may be obtained in an unsupervised manner.

Turning to FIG. 1, there is shown general conceptual diagram including components that retrain a recognizer 102 using labeled acoustic data as the adaptation data 104. In the example of FIG. 1, call log mining 106 extracts a set of waveform, grapheme sequence pairs $(x_i, g_i)$ from the acoustic data log 104. An example of how such waveform, grapheme pairs 108 may be collected in an unsupervised manner from actual user speech is described below with reference to the example flow diagram of FIG. 4.

As described below, the recognizer 102 initially uses a probability-based graphoneme to phoneme model 110 that is trained using a pronunciation lexicon to recognize phoneme sequences for given waveform, grapheme sequence pairs 108, e.g., providing grapheme sequence, phoneme sequence pairs $(g_i, \phi_i)$ as recognized output 112. As also described below, a retraining mechanism 114 then produces a grapheme-to-phoneme model 116 that is used in subsequent recognition. As can be seen, there is basically provided a feedback loop such that as more labeled acoustic data (waveform, grapheme pairs) become available, the better the grapheme-to-phoneme model 116 becomes.

Given the set of labeled adaptation data 108, one potential approach to adapting a graphoneme n-gram model is to re-estimate model parameters that maximize the joint likelihood log p(x,g), leading to maximum likelihood estimation (MLE). Alternatively, the conditional likelihood log p(g|x) may be directly maximized using a discriminative training (DT) approach. These two approaches are described below with respect to FIGS. 2 and 3, respectively.

Turning to a consideration of maximum likelihood training of graphoneme model parameters using acoustic data, given grapheme sequence and acoustic sample pairs, n-gram based graphoneme model parameters that maximize Equation (4) are trained:

$$\sum_{i=1}^{m} \log p_\theta(x_i, g_i) = \sum_{i=1}^{m} \log \sum_{\phi_i, s_i} p_\theta(x_i, g_i, \phi_i, s_i) \quad (4)$$

In other words, given a set of $(x_i, g_i)$, pairs, the objective of maximum likelihood estimation is to maximize Equation (4). In one example, the training can be achieved using the algorithm exemplified in the steps of FIG. 2.

More particularly, a standard EM algorithm can be applied to cope with hidden variables $$\{\phi_i, s_i\}_{i=1}^{m}.$$

Alternatively, the Viterbi algorithm may be applied, which is described herein.

Figure 2:
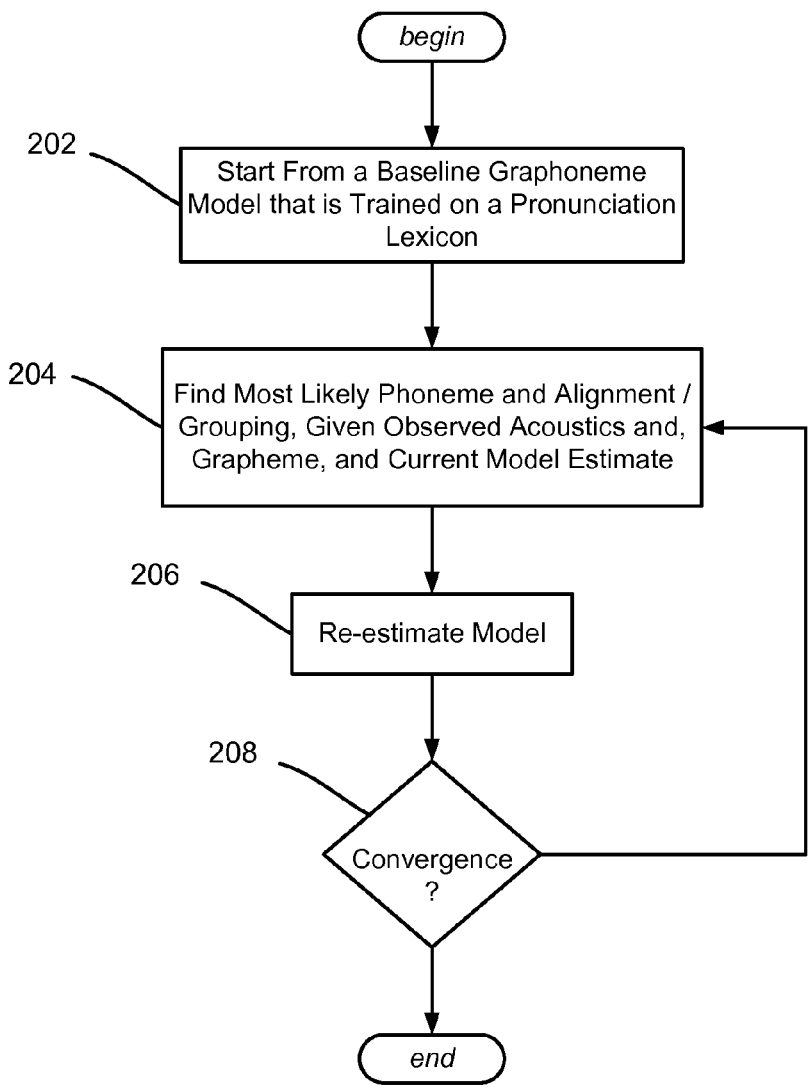
FIG. 2 is a flow diagram representing example steps that may be taken in training a speech recognition model to tune parameters using maximum likelihood estimation.

One such special optimization procedure is shown in FIG. 2, beginning at step 202 of FIG. 2 which represents starting from a baseline graphoneme model ($\theta_0$) that is trained on a pronunciation lexicon as described above.

Step 204 represents finding the most likely $\phi_i$ and $s_i$, given the observed $(x_i, g_i)$, and the current model estimate $\theta$:

$$\hat{\phi}_i, \hat{s}_i = \underset{\phi_i, s_i}{\operatorname{argmax}} \log p_\theta(\phi_i, s_i | x_i, g_i) \quad (5)$$
$$= \underset{\phi_i, s_i}{\operatorname{argmax}} \log p(x_i | \phi_i) + \log p_\theta(g_i, \phi_i, s_i)$$

Step 206 re-estimates the model by the following:

$$\hat{\theta} = \underset{\theta}{\operatorname{argmax}} \sum_{i=1}^{m} \log p_\theta(g_i, \hat{\phi}_i, \hat{s}_i) \quad (6)$$

Step 208 iterates by repeating steps 204 and 206 until convergence, as is typical in training mechanisms.

Note that to reduce computation, in each iteration of the above algorithm, the current graphoneme model is used to generate n-best phoneme sequence hypotheses for a given grapheme sequence, after which Equation (5), is used to re-rank (re-score) the n-best hypotheses. In other words, for computational convenience, for each i, the "argmax" operation in Equation (5) is taken only with respect to the top n phoneme sequences $\phi_i$ that yield the highest log $p_\theta(g_i; \phi_i; s_i)$ scores. Further note that the n-best list could also be generated by a phonetic decoder, but this likely may introduce "linguistically incorrect" pronunciations that are not desired in training a grapheme-to-phoneme model.

Another issue that is considered is when $g_i$ is not the correct label for $x_i$, which can happen particularly when using unsupervised data collection, (as described below with reference to FIG. 4). Such noisy samples will "contaminate" the graphoneme model. There is thus provided an aspect directed towards filtering out noisy data by setting a confidence threshold, that is, an acoustic model confidence value of $\alpha$ is used; a sample is discarded if:

$$\log p(x_i | \hat{\phi}_i) < \alpha \quad (7)$$

One basis for such filtering is that if $g_i$ is not the correct label for $x_i$, then it is unlikely that any of the n-best $\phi_i$ (and hence $\hat{\phi}$) will yield a high acoustic model score.

The above approach yields a graphoneme model that is optimized with respect to an adaptation set. Depending on the amount of adaptation data, this model may or may not generalize well. A more robust approach may be to leverage information from the pronunciation lexicon on which the baseline graphoneme model is trained. This resembles the idea of language model adaptation which attempts to learn models for a new domain (often with limited data) by leveraging existing, out-of-domain data.

Various strategies may be used in the context of adapting a graphoneme model, including model interpolation and/or data combination. In general, model interpolation linearly interpolates graphoneme model parameters trained using a pronunciation lexicon with that trained using acoustic data. In other words, model interpolation obtains a model $\theta^{ML}$ from Equation (6) (after convergence), and interpolates it linearly with the baseline graphoneme model $\theta_0$. The interpolation weights are tuned on a development set.

With respect to data combination, in general given grapheme sequence and acoustic sample pairs, the corresponding phoneme sequence is obtained by Equation (5) after training converges. The grapheme-phoneme pairs obtained in this way can be combined directly with a pronunciation lexicon for retraining. In other words, data combination obtains $\hat{\phi}_i$ from Equation (5) (again after convergence) for each i. Data combination then combines $\{(g_i, \hat{\phi}_i)\}_{i=1}^{m}$ with the original pronunciation lexicon, and retrains a model as described above. In this regard, $\{(g_i, \hat{\phi}_i)\}_{i=1}^{m}$ functions like a "pronunciation lexicon" that is generated from acoustic data. However, unlike a typical pronunciation lexicon where each $(g, \phi)$ value is unique, $\{(g_i, \hat{\phi}_i)\}_{i=1}^{m}$ can contain identical entries, $(g_i = g, \hat{\phi}_i = \phi)$ for multiple i. Note that this redundancy can be useful, as it naturally defines a prior distribution $p(g, \phi)$ that is absent from a pronunciation lexicon. Note that such redundancy may also be removed by collapsing identical entries after data combination.

Turning to an alternative training mechanism, given grapheme and acoustic sample pairs, one example implementation of discriminative training (DT) of graphoneme model parameters using acoustic data trains n-gram based graphoneme model parameters that maximize Equation (8), using approximations according to Equation (9) as set forth below. Note that while maximum likelihood estimation aims to find parameters that best describe the data, and is statistically consistent under the assumptions that the model structure is correct, that the training data is generated from the true distribution, and that there is a very large amount of such training data, such conditions are rarely satisfied in practice. As a result, discriminative training, which directly targets for better classification/recognition performance, often yields superior performance.

In the context of grapheme-phoneme conversion, discriminative training attempts to estimate graphoneme model parameters in such a way that pronunciations generated by this model maximally reduce recognition error. The following equation is directed towards maximizing the conditional likelihood of a grapheme sequence, given acoustics:

$$\sum_{i=1}^{m} \log p_\theta(g_i | x_i) = \sum_{i=1}^{m} \log \frac{p_\theta(x_i, g_i)}{\sum_{g'_i} p_\theta(x_i, g'_i)} \quad (8)$$

The computation of $p(x_i, g_i)$ involves the marginalization over $\phi_i, s_i$. Here an approximation is made that:

$$p_\theta(x_i, g_i) = \sum_{\phi_i, s_i} p_\theta(x_i, g_i) \approx p_\theta(x_i, g_i, \hat{\phi}_i, \hat{s}_i) \quad (9)$$

where $\hat{\phi}_i, \hat{s}_i$ are defined in Equation (5). Equation (8) consequently becomes:

$$\approx \sum_{i=1}^{m} \log \frac{p(x_i | \hat{\phi}_i) p_\theta(\hat{\phi}_i, \hat{s}_i, g_i)}{\sum_{g'_i} p(x_i | \hat{\phi}'_i) p_\theta(\hat{\phi}'_i, \hat{s}'_i, g'_i)} \quad (10)$$

Stochastic gradient descent can be applied to find a locally optimal estimate $\theta^{DT}$.

Figure 3:
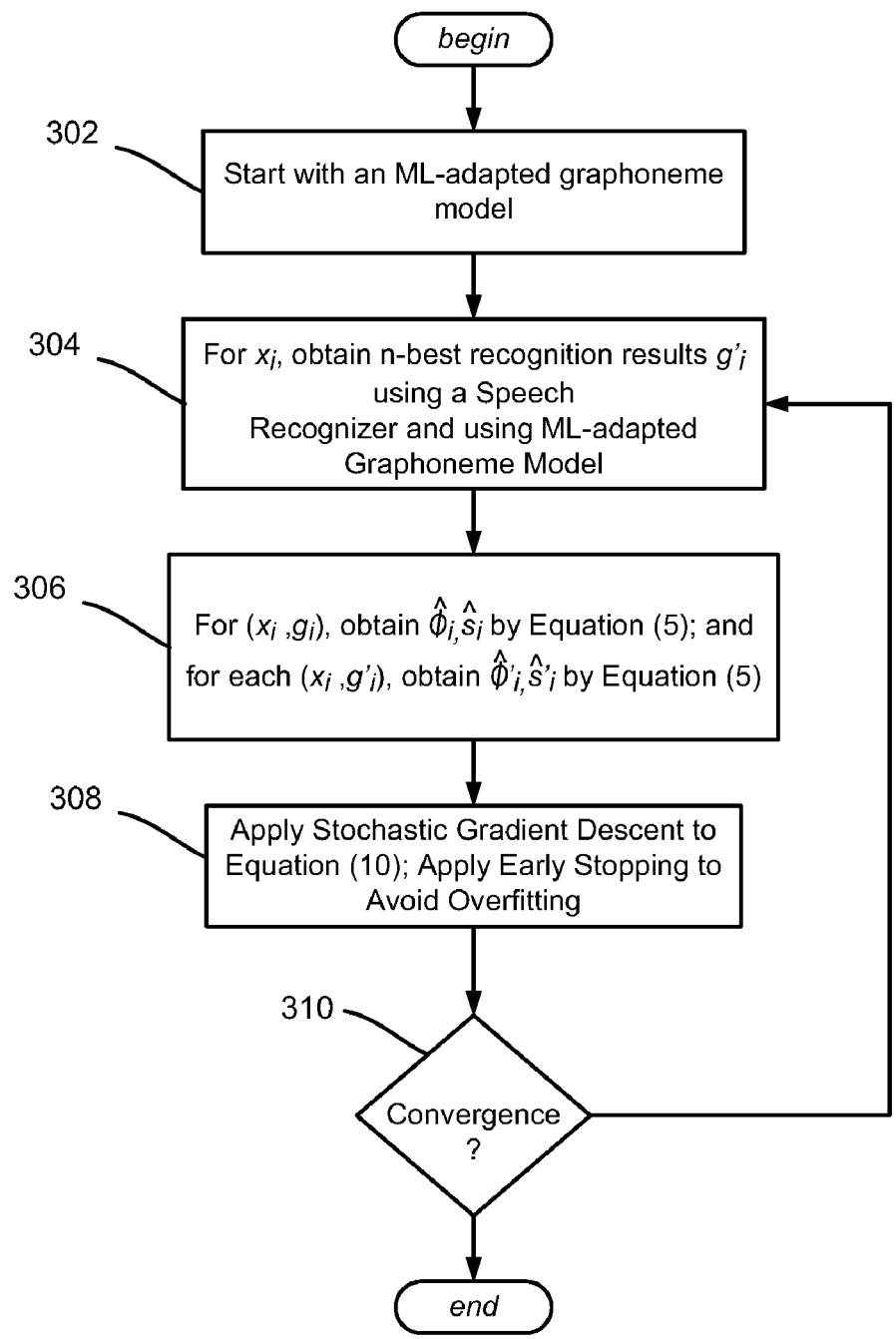
FIG. 3 is a flow diagram representing example steps that may be taken in training a speech recognition model to tune parameters using discriminative training.

More particularly, an example training procedure is described with reference to the flow diagram of FIG. 3, beginning at step 302 which represents starting with an ML-adapted graphoneme model $\theta^{ML}$ as described above. Step 304 obtains the n-best recognition results $g'_i$ for $x_i$, by using a speech recognizer and using the ML-adapted graphoneme. At step 306, for acoustic/grapheme pair $(x_i, g_i)$, $\hat{\phi}_i$, $\hat{s}_i$ obtained by Equation (5); similarly for each pair $(x_i, g'_i)$, $\hat{\phi}'_i$, $\hat{s}'_i$ is obtained by Equation (5).

Step 308 applies stochastic gradient descent to Equation (10) with respect to θ. Early stopping to avoid overfitting is applied. Note that in an n-gram model with backoff, if an n-gram does not exist in the model, its probability is computed by backing off to a lower-order distribution. There are several options regarding how to handle backoff in discriminative training; however in one option of handling such backoffs, a backoff weight is fixed and lower-order n-gram parameters are updated in step 308.

Step 310 repeats steps 304, 306 and 308 until convergence.

For consistency with training in which optimization is conducted on n-best grapheme sequences (Equation (10)), the discriminatively trained model may be evaluated in a similar fashion. For each $x_i$ in the test set, n-best $g'_i$ are generated using a speech recognizer and using the ML-adapted graphoneme model $\theta^{ML}$. The following rescores $g'_i$ using the model obtained by discriminative training:

$$\hat{g}_i = \underset{g'_i}{\mathrm{argmax}}\ p_\theta \cdot (g'_i | x_i) \quad (11)$$

$$= \underset{g'_i}{\mathrm{argmax}}\ p(x_i | \hat{\phi}'_i) p_{\theta DT}(\hat{\phi}'_i, \hat{s}'_i, g'_i)$$

Note that the same approximation is used as was used in Equation (10). Recognition error rates based on $\hat{g}_i$ may be measured as obtained from rescoring.

Turning to another aspect, there is described the unsupervised acquisition of grapheme labels for acoustic data. To this end, various types of acoustic data may automatically obtained from call logs corresponding to actual user calls. Interaction with the user to confirm recognition (or ultimately provide a spelling if unable to confirm) provides the grapheme label for that acoustic data.

Figure 4:
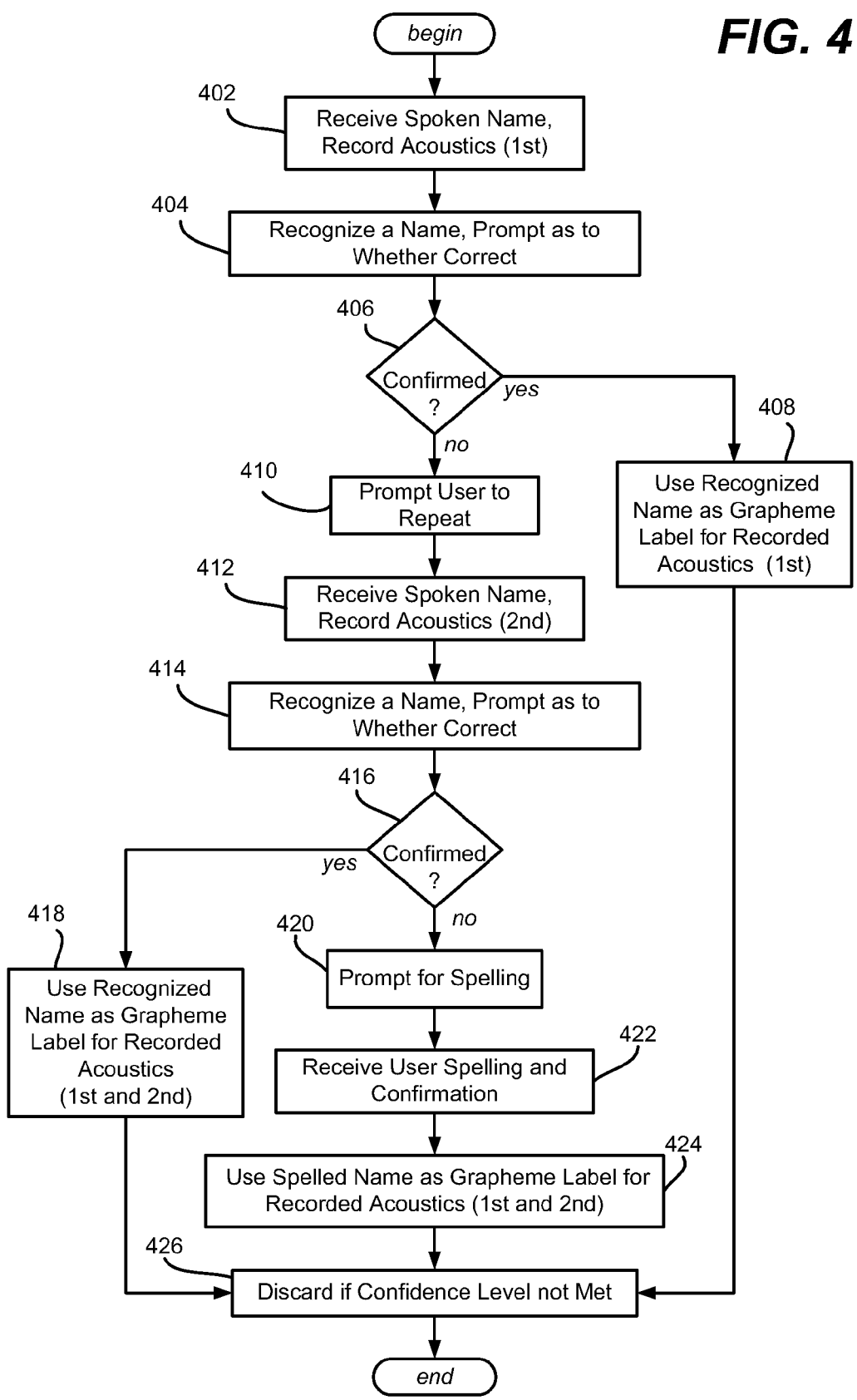
FIG. 4 is a flow diagram representing an example steps that may be taken to obtain acoustic data and assign grapheme labels to the acoustic data in unsupervised data collection.

By way of example, FIG. 4 shows example steps of such an unsupervised acquisition mechanism with respect to name recognition. In FIG. 4, as a user speaks a person's name (e.g., John Doe), the acoustic data is received and recorded (step 402). Note that at step 404 the recognizer determines a name, and using text-to-speech, prompts the user to confirm the recognized name, e.g., "Did you say John Doe?"

If at step 406 the user confirms "yes" to the prompt, the text corresponding to the recognized name at step 404 is used in step 408 as the grapheme label for the acoustics recorded at step 402. The process then ends, although appropriate action to transfer the call to the requested person or the like is of course performed.

Conversely, if the user confirms "no" at step 406, in this example, the system/recognizer asks the user to repeat the name at step 410; (an alternative is to prompt the user with the second most likely name before asking to repeat). Steps 412, 414 and 416 are basically analogous to steps 402, 404 and 416, that is, the user speaks a name, the recognizer recognizes a name from the received speech and asks the caller to confirm the re-recognized name. Note that a second set of acoustic data is (ordinarily, unless the caller hangs up) received at step 412 that is at least a little bit different from the first set; in the event the recognizer determines the same name (which is most likely incorrect unless the caller accidentally said "no"), the recognizer can prompt with the second most probable name recognized with respect to this acoustic data input.

If at step 416 the user confirms "yes" to this second attempt in this example, at step 418 the recognized name at step 414 is used as the grapheme label for each of the recorded acoustics, as recorded at step 402 (labeled "1st" in FIG. 4) and as recorded at step 412 (labeled "2nd" in FIG. 4). Note that a typical user will speak the same name twice and thus both first and second sets of acoustic data are associated with the same grapheme label. However, if the user clearly speaks two different names rather than repeating the same name, the first set of acoustic data can be discarded by a filtering mechanism as obtained by Equation (7) or the like.

Returning to step 416, if the user confirms "no" to the second attempt, in this example the recognizer/system asks for spelling of the name at step 420. Step 422 represents the user providing the spelling and confirming "yes" to a name retrieved from the spelling; note that an incorrectly spelled name may still be used if the system is able to recognize a correctly spelled name from the input, e.g., similar to automatic spell checking. Assuming that a correctly spelled name is input (or matched), at step 424 the spelled name is used as the grapheme label for each of the (1st and 2nd) recorded acoustics. Note that an improperly spelled a name may remain as a valid grapheme label, as other callers may similarly misspell such a name.

As can be readily appreciated, manual transcription in a large-scale voice dialing system is an expensive and error-prone task due to the large number of (and sometimes confusable) names in the grammar. A dialog analysis as described above that is based on successful confirmation automatically obtains grapheme labels for a subset of acoustic data. At the end of this dialog session, the system logs an event that the call was transferred to the requested party. Because the user confirmed correctness ("yes") with the system before the transfer, it is reasonable to assume that the name of the person to whom the call is transferred is the correct grapheme label for the corresponding waveform. As demonstrated in the example of FIG. 4, the system may go through multiple rounds of interactions before the user gives a positive confirmation, whereby the grapheme label obtained from the confirmed transfer may correspond to multiple waveforms in that dialog session.

As can also be readily appreciated, however, such an assumption in an unsupervised system potentially introduces noise in the data. For example, the destination to which a call is transferred may not be the true grapheme label for the corresponding waveform (waveforms). In fact, a user may inadvertently or otherwise confirm "yes" to the system for an incorrectly recognized name (often due to confusable pronunciations generated by text-to-speech), whereby the call is transferred to a wrong person and the grapheme does not match the acoustic data. As described above, Equation (7) is applied to discard (filter out) such noisy data from the adaptation set, as represented in FIG. 4 via step 426.

Exemplary Operating Environment

Figure 5:
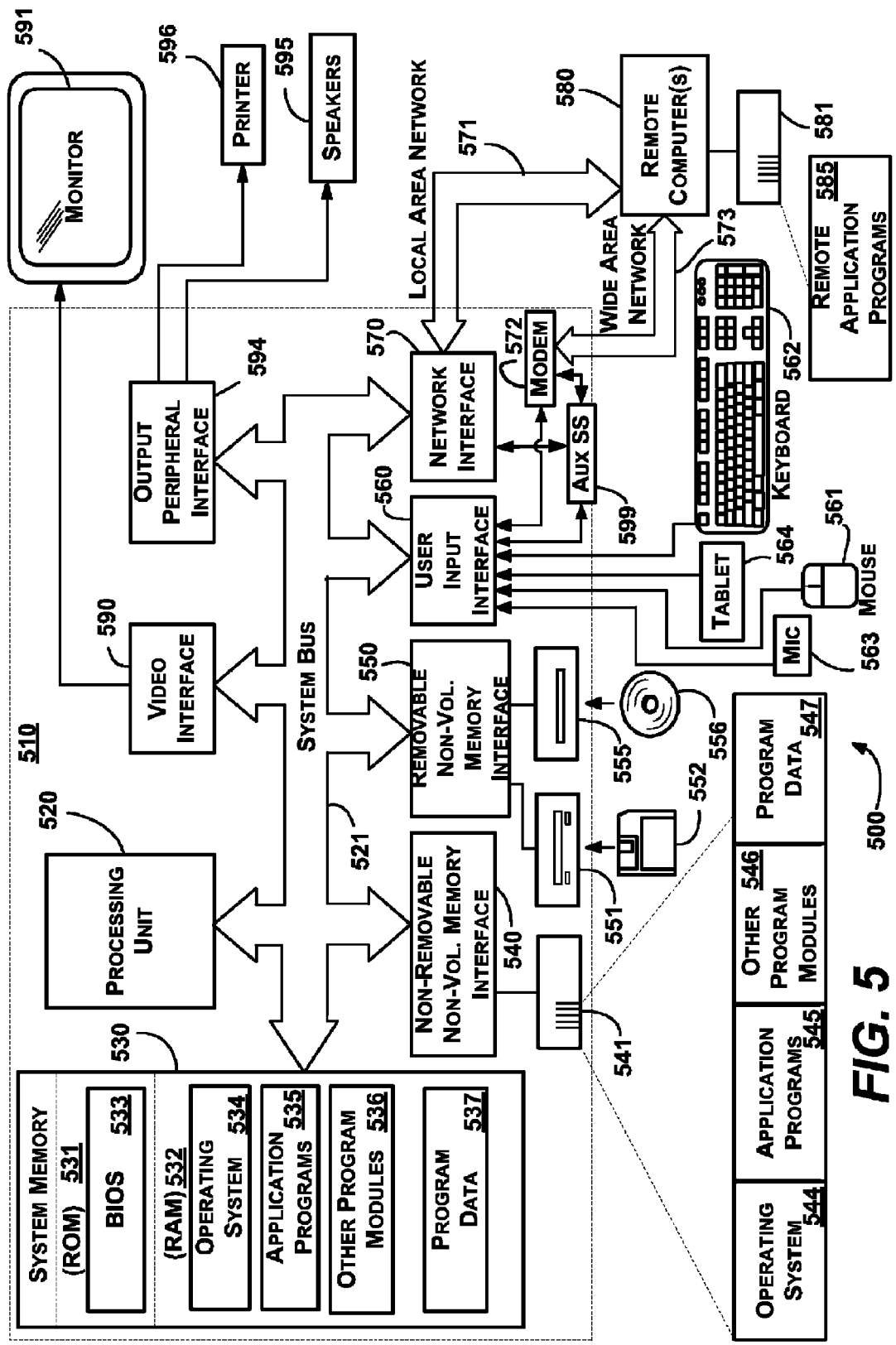
FIG. 5 shows an illustrative example of a computing environment into which various aspects of the present invention may be incorporated.

FIG. 5 illustrates an example of a suitable computing system environment 500 on which the examples of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method performed by a computer comprising storage and a processor, the method comprising:
modeling acoustic data, a phoneme sequence, a grapheme sequence and an alignment between the phoneme sequence and the grapheme sequence to provide a graphoneme model stored in the storage; and
retraining, by the processor, a grapheme to phoneme model usable in speech recognition by optimizing the graphoneme model using acoustic data stored in the storage.

2. The method of claim 1 wherein optimizing the graphoneme model comprises performing maximum likelihood training of graphoneme model parameters using the acoustic data.

3. The method of claim 2 wherein the maximum likelihood training includes using a current graphoneme model to generate a set of best phoneme sequence hypotheses for a given grapheme sequence, and re-ranking the set of best hypotheses based on acoustic data and the current graphoneme model.

4. The method of claim 1 wherein optimizing the graphoneme model comprises performing discriminative training of graphoneme model parameters using the acoustic data.

5. The method of claim 1 wherein retraining the grapheme to phoneme model comprises combining a pronunciation lexicon and acoustic information.

6. The method of claim 5 wherein combining the pronunciation lexicon and the acoustic information comprises interpolating graphoneme model parameters trained using a pronunciation lexicon with those trained via maximum likelihood training or discriminative training using acoustic data.

7. The method of claim 5 wherein combining the pronunciation lexicon and the acoustic information comprises obtaining a phoneme sequence corresponding to an acoustic waveform sample and a grapheme sequence corresponding to the same acoustic waveform sample to obtain a grapheme-phoneme pair, and combining a substantial number of such grapheme-phoneme pairs with data in the pronunciation lexicon.

8. The method of claim 1 further comprising, collecting a grapheme label for an acoustic waveform received as speech input from a speaker, including by recording the acoustic data, recognizing the acoustic data as a potential grapheme label, obtaining confirmation from the speaker that the potential grapheme label correctly applies to the speech input, and persisting the acoustic data in association with an actual grapheme label that corresponds to the potential grapheme label upon the confirmation.

9. The method of claim 8 further comprising performing a plurality of interactions with the speaker to receive the acoustic data and obtain the confirmation.

10. The method of claim 8 further comprising filtering out the acoustic data and the associated grapheme label for speech input that does not meet a confidence threshold.

11. A computer system comprising:
a grapheme to phoneme model stored in storage of the computer;
a recognizer coupled to the grapheme to phoneme model to recognize input speech as a corresponding grapheme sequence, the recognizer executed by a processor of the computer; and
a retraining mechanism coupled to the recognizer that retrains the grapheme to phoneme model into a retrained grapheme to phoneme model based upon acoustic data and associated graphemes collected by a recognition system, the retraining mechanism executed by the processor of the computer.

12. The computer of claim 11 wherein the retraining mechanism performs maximum likelihood training or discriminative training of grapheme to phoneme model parameters based on the acoustic data.

13. The computer of claim 11 wherein the retraining mechanism combines a pronunciation lexicon and acoustic information by interpolating grapheme to phoneme model parameters trained using a pronunciation lexicon with those trained using acoustic data, or by obtaining a phoneme sequence corresponding to an acoustic waveform sample and a grapheme sequence corresponding to the same acoustic waveform sample to obtain a grapheme-phoneme pair, and combining a substantial number of such grapheme-phoneme pairs with data in the pronunciation lexicon.

14. The computer of claim 11 wherein the recognition system collects the acoustic data and associated graphemes by recording acoustic data input as speech by a speaker, recognizing the acoustic data into data corresponding to a grapheme label, and associating the acoustic data with the grapheme label upon obtaining confirmation from the speaker that the grapheme label correctly applies to the speech input.

15. The computer of claim 14 wherein the recognition system comprises a mechanism that receives speech in the form of a name, records the acoustic data corresponding to the name, recognizes the name as the grapheme label, and persists the acoustic data in conjunction with the grapheme label.

16. The computer of claim 14 further comprising means for filtering out the acoustic data and the associated grapheme label for speech input that does not meet a confidence threshold.

17. One or more tangible computer-readable storage media storing information to enable a computer to perform a process, the process comprising:
    modeling, by the computer, acoustic data, a phoneme sequence, a grapheme sequence and an alignment between the phoneme sequence and the grapheme sequence to provide a graphoneme model stored by the computer;
    retraining, by the computer, a grapheme to phoneme model by optimizing the graphoneme model using acoustic data stored in the storage; and
    using the grapheme to phoneme model to perform speech recognition by the computer.

* * * * *